(12) United States Patent
Spitzer et al.

(10) Patent No.: US 6,912,307 B2
(45) Date of Patent: Jun. 28, 2005

(54) METHOD FOR AUTOMATIC COLOR AND INTENSITY CONTRAST ADJUSTMENT OF STILL AND VIDEO IMAGES

(75) Inventors: Hedva Spitzer, Tel Aviv (IL); Eilon Sherman, Ramat Gan (IL)

(73) Assignee: Ramot Fyt Tel Aviv University Ltd., Tel Aviv (IL)

( * ) Notice: Subject to any disclaimer, the term of this patent is extended or adjusted under 35 U.S.C. 154(b) by 571 days.

(21) Appl. No.: 09/777,950

(22) Filed: Feb. 7, 2001

(65) Prior Publication Data

US 2002/0167615 A1 Nov. 14, 2002

(51) Int. Cl.[7] .................................................. G06K 9/00

(52) U.S. Cl. ...................... 382/167; 382/274; 382/279

(58) Field of Search .................... 382/162, 166–168, 382/274, 275, 279; 345/589, 591; 348/679; 358/1.9, 518–525

(56) References Cited

U.S. PATENT DOCUMENTS

| | | | |
|---|---|---|---|
| 5,500,904 A | * | 3/1996 | Markandey et al. ........ 382/103 |
| 5,555,324 A | * | 9/1996 | Waxman et al. ............ 382/254 |
| 5,771,312 A | * | 6/1998 | Spitzer ...................... 382/167 |
| 6,438,264 B1 | | 8/2002 | Gallagher et al. |

OTHER PUBLICATIONS

D. Hubel, "Eye, Brain, and Vision," Published by W.H. Freeman & Co., May 1995, Ch. 8.*
Rotgold et al., "Role of Remote Adaptation in Perceived Subjective Color," J. Optical Society of America, vol. 14, No. 6, Jun. 1997, pp. 1223–1230—Discusses how light adaptation to illumination presented peripherally changes the subjective color.*

Yee et al., "Spatiotemporal Sensitivity and Visual Attention for Efficient Rendering of Dynamic Environments ," ACM Tran. On Graphics, vol. 20, No. 1, Jan. 2001, pp. 39–65—Presents a global illumination computing method that takes advantage of the lim.*

Dahari et al., "Spatiotemporal Adaptation Model for Retinal Ganglion Cells," Journal of the Optical Society of America, vol. 13, No. 3, Mar. 1996, pp. 419–435.*

Bouzerdoum, "A Hierarchical Model for Early Visual Processing," SPIE Proc. Human Vision, Visual Processing, and Digital Display, V, Feb. 1994, pp. 10–17.*

*Spatiotemporal adaption model for retinal ganglion cells*—Dahari et al.—vol 13, No. 3 / Mar. 1996, J Opt. Soc. Am.A.

*Colour Contrast Induction*—Singer et al—Vision Research vol 34, No. 23 pp. 3111–3126, 1994.

Progress in Retinal Research–Visual Adaptation and Retinal Gain Controls–vl 3, pp. 263–346.

* cited by examiner

*Primary Examiner*—Bhavesh M. Mehta
*Assistant Examiner*—Yubin Hung
(74) *Attorney, Agent, or Firm*—Mark M. Friedman

(57) ABSTRACT

A method for automatic partial correction of the color contrast and intensity of color images. The images are processed in a manner similar to that by which the visual system processes signals related to color vision, to achieve better color contrast and to enhance achromatic contrast intensity for both still and video images.

46 Claims, 7 Drawing Sheets

METHOD FOR AUTOMATIC COLOR AND INTENSITY CONTRAST ADJUSTMENT OF STILL AND VIDEO IMAGES

FIELD AND BACKGROUND OF THE INVENTION

The present invention relates to image processing and, more particularly, to an automatic method for correcting the contrast and intensity of color still and video images.

The perceived colors of visible objects are determined, both by the physics of light reflection and by the way in which the visual system processes the reflected light that it receives. With regard to the physics, the physical color of the light reflected to the visual system by visible objects is determined, both by the reflectivity spectra of their surfaces, and by the color spectrum of the illuminating light. Photographs of scenes, including both still pictures and motion (e.g. video) pictures, whether recorded by analog means (photographic film) or digital means (video cameras), normally are perceived differently from the way the scenes themselves would be perceived by direct vision.

Most prior art methods dealing with color image processing of still and video pictures, and specifically with color and intensity contrast, approach the subject of improving or adjusting such contrast and/or intensity using principles unrelated to the human visual system and its physiology. A previous patent awarded to one of the present co-inventors, U.S. Pat. No. 5,771,312, describes physiologically-based color constancy adjustment of pictures, but does not deal with either color or intensity contrast. We are not aware of any method similar to the one proposed herein, that aims to emulate the human vision for improving color contrast and intensity. Present color contrast adjustment methods thus lack many of the physiological-like features that can lead to much improved color pictures.

There is thus a widely recognized need for, and it would be highly advantageous to have, a satisfactory method for performing color contrast correction, either automatically or interactively, on both still and video (motion) pictures. There is also a widely recognized need for, and it would be highly advantageous to have, a satisfactory method for performing local intensity correction, either automatically or interactively, on both still and video pictures.

SUMMARY OF THE INVENTION

The underlying concept of the present invention is to process color pictures in a manner similar to that in which the neurons of the visual system process signals related to color vision to achieve color contrast, and to adjust intensity, which is a component of color.

According to the present invention, there is provided a method for correcting the color contrast of a scene, the scene including an intensity spectrum at each of a plurality of pixels, the method comprising the steps of: a) providing a red image, a green image, and a blue image, each image having a pixel value at each of the plurality of pixels; at each pixel: b) computing a center red response, a center green response and a center blue response based on the images; c) computing a surround red response, a surround green response and a surround yellow response based on the images; d) computing a red, a green and a blue on-center non-filtered and filtered opponent response, based on the center and surround responses; e) computing a red, a green and a yellow off-center non-filtered and filtered opponent response based on the center and surround responses; f) computing a red, a green and a blue double-opponent (or "do") response and a corresponding filtered do-response based on the on-center and off-center non-filtered and filtered opponent responses; g) computing a red, a green and a blue do-remote signal based on a set of responses selected from the group consisting of the on-center filtered opponent responses and the filtered double-opponent responses; and h) for each pixel: correcting each of the red, green, and blue double-opponent responses for color contrast using respectively the red, green and blue do-remote signals, thereby producing new red, green and blue double-opponent responses.

Preferably, the method for correcting the color contrast of an image further comprises: at each pixel: i) computing a yellow non-filtered and filtered center response and a non-filtered and filtered blue surround response; j) computing a yellow non-filtered and filtered double-opponent response based on the non-filtered and filtered yellow center and blue surround responses; k) computing a yellow do-remote signal based on a response selected from the group consisting of the filtered yellow center response and the filtered yellow double-opponent response; and l) for each pixel: correcting the yellow double-opponent response for color contrast using the yellow do-remote signal, thereby producing a corrected yellow double-opponent response.

Preferably, the method for correcting the color contrast of an image further comprises: for each still image and for each pixel: a) inversely transforming the red, green and blue corrected double-opponent responses to obtain corresponding new red, green and blue opponent responses; and b) transforming the new red, green and blue opponent responses into corresponding new red, green and blue center responses.

Preferably, the method for correcting the color contrast of an image further comprises: for each picture and for each pixel: a) inversely transforming the corrected yellow double-opponent response to obtain a new yellow opponent response.

The method of color contrast adjustment according to the present invention can also be used to decrease artifacts of image compression (especially JPEG pictures), and to decrease artifacts of both compressed and uncompressed picture transmission According to the present invention there is further provided a method for adjusting an achromatic contrast of a scene, the scene including an intensity spectrum at each of plurality of pixels, the method comprising the steps of: a) providing an image that has an intensity value at each of the plurality of pixels; at each pixel: b) obtaining an adapted opponent center response using a plurality of the pixel intensity values, and c) at each pixel, correcting the achromatic contrast using the adapted opponent center response.

Preferably, the method for adjusting an achromatic contrast of a scene further comprises obtaining an adapted opponent surround response, wherein the step of correcting for achromatic intensity contrast includes subtracting the adapted opponent surround response from the adapted opponent center response.

According to the present invention there is further provided yet another method for adjusting an achromatic contrast of a scene, the scene including an intensity spectrum at each of a plurality of pixels, the method comprising the steps of: a) providing an image having a pixel value at each of the plurality of pixels; at each pixel: b) computing a center response based on the image; c) computing a surround response based on the image; d) computing a non-filtered and filtered on-center opponent response, based on the center and surround responses; e) computing a non-filtered and filtered off-center opponent response based on the center and surround responses; f) computing a double-opponent response and corresponding filtered double-opponent response based on the filtered on-center and off-center opponent responses; g) computing a do-remote signal; and h) for each pixel: correcting the double-opponent responses for achromatic contrast using the do-remote signal.

The method of achromatic contrast adjustment according to the present invention can be used to decrease artifacts of image compression (especially JPEG), to enhance achromatic contrast in pictures taken under poor lighting conditions or with poor equipment, and to decrease artifacts of both compressed and uncompressed image transmissions. Both color contrast and achromatic contrast adjustments as described herein can be applied to any type of arrayed data (or image), for example to an image represented in polar coordinates, etc.

Implementation of the algorithm (methods) for both color and intensity contrast correction, and also for object recognition, of the present invention may take one or more of this preferred forms:

1. a) Hardware: i. implementation on a dedicated chip; ii. implementation on a dedicated computer slot; iii. integration with another chip; and iv. integration with any other chip computer slot.
   b) Software: i. implementation as an add-on software to the hardware devices of 1(a); ii. implementation as a stand-alone software package; and iii. integration with another software package (such as CAD, image processing, etc.).
2. Enhancement of color contrast and intensity for still and video cameras. Cameras may include digital cameras and miniature video cameras (for video over IP applications).
3. Enhancement of color contrast and intensity in any imaging application, such as: a) Biomedical—endoscopy, diagnostic imaging (such as CT, MRI, etc). b) Science and research—any imaging for astronomy, chemistry, physics, biology, computer science, etc. c) Industrial—print industry (including digital-print), inspection, artificial imaging and robotics of any kind, automatic character or object recognition (OCR or ATR). d) Military and security applications—satellite images, long and short distance imaging and surveillance (ground based and aerial), displays, night vision and thermal vision (as false colors). e) Sports, news, fashion, commercials and advertisements. f) Professional, amateur and artistic photography.
4. Communication: a) Elimination of artifacts in transmitted images (still and video) due to compression (such as JPEG and MPEG) and transmission media affects. Applications may include video conferencing, broadcast, TV (of any format), HDTV.
5. Software applications: a) Enhancement of color contrast and intensity of images in a privately owned web-site. b) Same as (a), but as a download software. c) Same as (a) as a stand-alone software package. d) Same as (a) as a service (or even as a link) to another web site. End users may come from one or more of the fields of interest of 3 and 4.

The underlying concept of the present invention is to process color pictures in a manner similar to that in which the neurons of the visual system process signals related to color vision to achieve color contrast. Ideally, the input to the present invention is the intensity spectrum of a scene as a function of wavelength, measured at each pixel in an array of pixels. The term "scene", as used herein, refers to a set of objects that produce, by emission, by scattering or by reflection, visible light that can be perceived by a viewer. For example, a person viewing a pastoral scene sees light reflected by objects in the scene such as trees, grass, rocks and soil, as well as the scattered blue light of the sky. In each of the viewer's eyes, light from the scene is focused by the lens of the eye onto the retina of the eye. The light impinging on each point of the retina is characterized by an intensity spectrum that spans the full range of wavelengths of visible light. In the case of an imaging apparatus such as a digital camera, the optics of the imaging apparatus typically focuses the light onto an array of sensors such as charge coupled devices; each sensor then produces a set of signals that correspond to spectral subbands of the light from one pixel of the scene. Ideally, the intensity spectrum would be multiplied by the spectral response function of each of the types of photoreceptor cells of the retina (red cones, green cones, and blue cones) to incident light, and integrated with respect to wavelength, thereby providing, at each pixel, a red intensity value, a green intensity value, and a blue intensity value. Collectively, the red values, the green values, and the blue values are examples of what is referred to herein as "images": rectangular arrays of values, one value per pixel. These values then are processed according to the algorithm of the present invention to provide images corrected for color contrast and intensity contrast.

This ideal input rarely is attainable. Therefore, the scope of the present invention includes the processing of images obtained by other means. For example, the three input images may be in the form of analog signals from transducers whose spectral responses are similar to the spectral responses of cone cells, in which case the intensity values are electrical signals, typically voltage levels. These analog signals may be processed directly, using an embodiment of the present invention in analog hardware. Alternatively, these analog signals may be digitized, and processed digitally according to the present invention. Usually, however, the input to the present invention consists of digital images, such as are acquired by video cameras, that come ultimately from transducers whose spectral responses does not necessarily match the responses of cone cells. In that case, the digital pixel intensity values can be transformed to photoreceptor response coordinates, or "fundamentals", corresponding to the spectral responses of the three types of cones, the responses of similar transducers that are used as "cones", or inputs from any other color scale.

The most common color coordinate system for digital color images is the so-called red-green-blue, RGB, or chromaticity, coordinates. Digital images in other three-color schemes, such as yellow-cyan-magenta, may be transformed mathematically to r-g-b. The transformation from RGB coordinates, or from CIE Yxy coordinates, to photoreceptor coordinates may be found, for example, in G. Wyszecki and W. S. Styles, "Color Science" (Wiley, 1982), pages 139 and 615. In what follows, all references to "red", "green" and "blue" will be to photoreceptor response coordinates, and not to chromaticity coordinates, and instead of the RGB scale, use will be made of the LMS (long-medium-short wavelength) scale. When "red" "green" and "blue" are specified, they are used as equivalents to L, M, and S respectively.

The present invention includes an algorithm in the spirit of that presented by Ronen Dahari and Hedva Spitzer in an article titled "Spatiotemporal adaptation model for retinal ganglion cells", published in the Journal of the Optical Society of America Series A, Volume 13 Number 3 (March 1996), which article is incorporated by reference for all purposes as if fully set forth herein. The paper by Dahari and Spitzer presents a model for the adaptation of visual perception to changing intensity of illumination. It has been conjectured that color contrast perception and intensity contrast perception work by an analogous mechanism, with modifications as described herein.

FIG. 1 is a schematic description of a cross section of the human retina, showing that the retina consists of five layers of cells, primary receptors 4, bipolar cells 8, amacrine cells 10, and retinal ganglion cells 12. Receptors 4 shown here are cone and rod cells together. The rods respond to light intensity, rather than color. The mechanism of adaptation to changing intensity modeled by Dahari and Spitzer operates in achromatic retinal cells 12. The receptive field (RF) of both chromatic and achromatic ganglion cells 12 includes both on-center and off-center receptors 14 of the center RF area, and receptors 16 of the surround RF area. Hereafter, "center" and "surround" may be written as "cen" and "srnd" respectively.

The responses of center area sub-regions 14 and surround area sub-regions 16 are combined in ganglion cell 12, in one of two different ways, depending on the type of ganglion cell 12. As shown in FIG. 2, an "on-center" cell 20 responds positively ("+") to signals of increased light intensity 24 (e.g. $L^+$) from the center area (or sub-region) of the RF, and negatively to signals of increased light intensity 26 (e.g. $M^-$) from the surround area (or sub-region) of the RF. An "off-center" cell 22 responds negatively ("−") to signals of increased light intensity 28 from the center area of the RF (e.g. $L^-$), and positively to signals of increased light intensity 30 from the surround area of the RF (e.g. $M^+$). Cells 20 and 22 are also referred to as "opponent" cells. The physiological responses can be translated into mathematical expressions, and this will be done consistently throughout the following description.

The "double-opponent" cells of the visual cortex (which have spatially larger RFs than the opponent cells), combine the responses of the on-center and off-center retinal ganglion (opponent) cells in a manner that resembles a mathematical spectral and spatial derivative. For example, FIG. 3 shows a double-opponent cell 40 that gets its own double-opponent center response $L_{do-c}$ ("double-opponent center" response, or "do-center" response) from a first group of on-center ganglion cells 42 (for example, $L^+M^-$, the group that subtracts green surround responses from red center responses) whose RFs are located in a do-center area 44, and gets its own double-opponent surround response $L_{do-s}$ ("do-surround response") from a corresponding group of off-center (e.g. $L^-M^+$) cells 46, whose RFs are located in a do-surround area 48. The do-surround response is related to area 48.

A "do-remote" area 50 has the shape of an annulus, concentric with that of the "do-center" and of the "do-surround" areas. Typically, the internal diameter of the "do-remote" area is equal to the external diameter of the "do-surround" and therefore does not overlap the "do-center" or the "do-surround"'s. However, there may also be some overlap or some gaps between the do-remote and the do-surround areas One of the innovative aspects of the present invention is, that in contrast with U.S. Pat. No. 5,771,312, in the color contrast adaptation of the present invention the influence of a "remote" region affects the color contrast response of double-opponent (cortical) cells.

There are six (or alternatively eight, including the yellow on- and off-center cells) main groups of retinal ganglion cells 12 involved in color perception, corresponding to the three kinds of cone cells that respond to color analogously to the response of receptors (rod cells) 4 to intensity. An image is first processed in three most common color-coded channels in the retina ($L^+M^-$, $M^+L^-$ and $S^+(L^+M)^-$) to three activation-level maps of on-center opponent Parvo long-medium-short wavelength (P-LMS) cells through different retinal layers originating in (receptors) cones 4 (FIG. 1). The off-center opponent cell types $L^-M^+$, $M^-L^+$ and $S^-(L^+M)^+$ have similar RF structure but with opposite signs. The input to the cones level is the spectral composition of the light reaching the retina, when illumination falls on a surface of the objects and is reflected from it. The field of view is mapped by the three types of cones, L, M and S. The quantum catches of the three cone types, $L_{pigment}$, $M_{pigment}$ and $S_{pigment}$, are typically expressed by an integration of the inner triple product of the spectral sensitivity of each pigment type with the reflectance properties and with the spectral and intensity absorption properties of the surface, at any specific location in the image (Wyszeki & Styles). The responses of the three cone-types, $L_{cone}$, Mcone and $S_{cone}$, normalized separately to a range of 0–1, are typically expressed by a Naka-Rushton equation as a function of their inputs $L_{pigment}$, $M_{pigment}$ and $S_{pigment}$ (Dahari and Spitzer; Wyszeki & Styles). The input red, green, and blue intensity values are treated as though they are the responses of red, green and blue cone cells.

The intensity values are transformed into a "response image" in a manner similar to that by which on-center and off-center retinal ganglion cell respond to inputs from cone cells and other cells in the retinal pathway. It is to be understood that in the present invention, in a manner analogous with that of U.S. Pat. No. 5,771,312, references to an "image" herein are references to values at pixels, or "pixel values", treated collectively as an array. Thus, the term "image" as used herein includes purely mathematical objects, and does not necessarily correspond to a physical image, although the original input images certainly do correspond to physical images.

The first stage of the forward transformation is performed analogously to the top path of FIG. 1a, taken from of Dahari and Spitzer (notwistanding the fact that Dahari and Spitzer's paper does not contain color information), to provide, at each pixel, an opponent red center response (the pixel value of a "response function"), an opponent green center response, and an opponent blue center response. Optionally, a fourth, yellow opponent center response, which is calculated by simply adding the red and green responses, is obtained with the same forward transformation. In what follows, the fourth color (yellow) is optional in all transformations at the level of opponent and double-opponent cells. A similar transformation is used to obtain red, green and blue surround responses. These surround responses are subtracted from the center responses, in emulation of the action of "on-center" and "off-center" retinal ganglion cells, as follows: the green surround response is subtracted from the red center response; the red surround response is subtracted from the green center response; and the red surround response and the green surround response are averaged to form a yellow surround response, which is subtracted from the blue center response. Optionally, the blue surround response is subtracted from the yellow center response.

The second stage of the forward transformation deals with the simulation of double-opponent responses that emulate the action of (cortical) "double-opponent" color coded Parvo double opponent LMS (Pdo-LMSs) cells, and includes an additional remote adaptation. The color-coded double-opponent cells are adapted (corrected) by a remote adaptation in a manner similar to a mechanism based on psychophysical findings, as shown in Singer & D'Zmura, Vision Research, vol. 34, pp. 3111–3126, 1994. Adaptation is also explained (but not in relation to color and do-remote area) in Dahari and Spitzer. Note that "remote" adaptation refers to the effect of regions peripheral to the "classical" RF.

The third stage deals with the simulation of an "inverse" transformation", i.e. the transformation of the activity of these double-opponent "adapted" cells to a perceived image in a standard CIE notation (XYZ), in a RGB scale, in a Lu*v* scale, or in any other standard color scale.

Regarding intensity contrast adjustment, the method includes similar forward and, optionally, inverse transformations, carried out by the emulation of the action of magno (M) cells.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
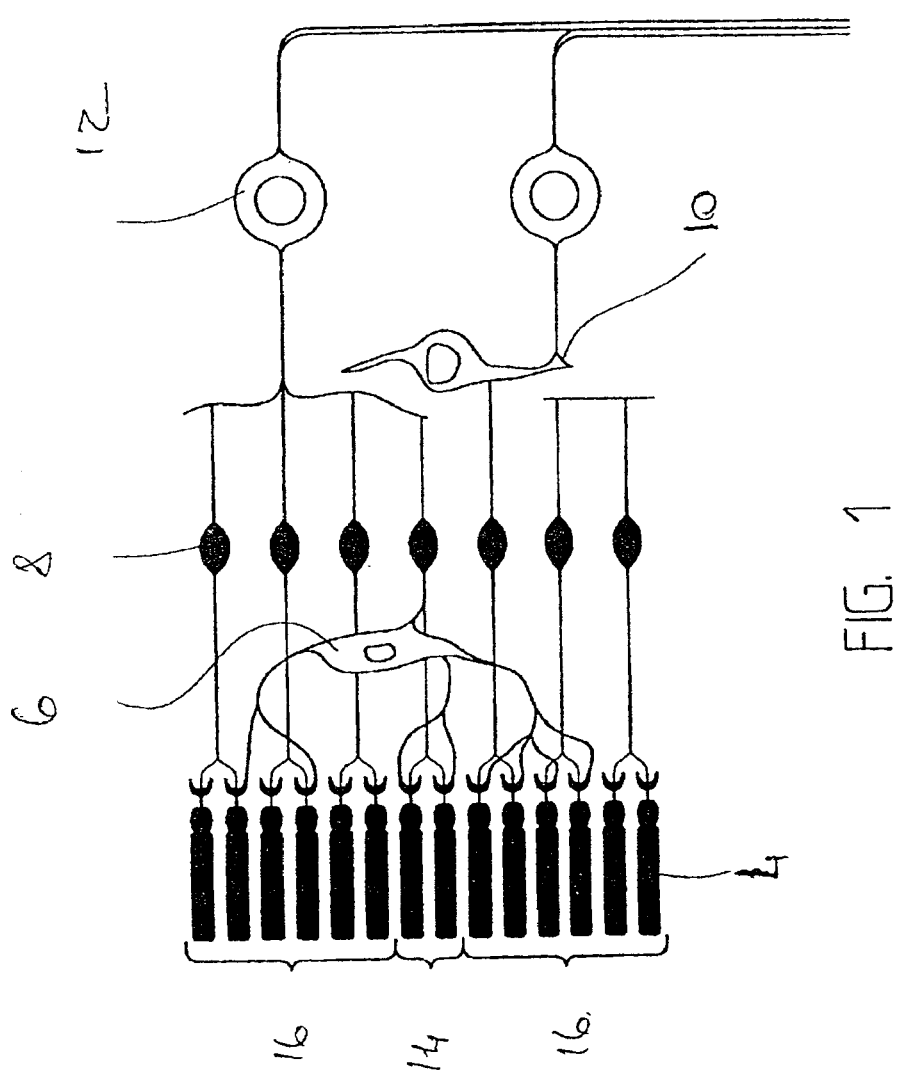
FIG. 1 is a schematic cross section of a human retina.
Figure 1A:
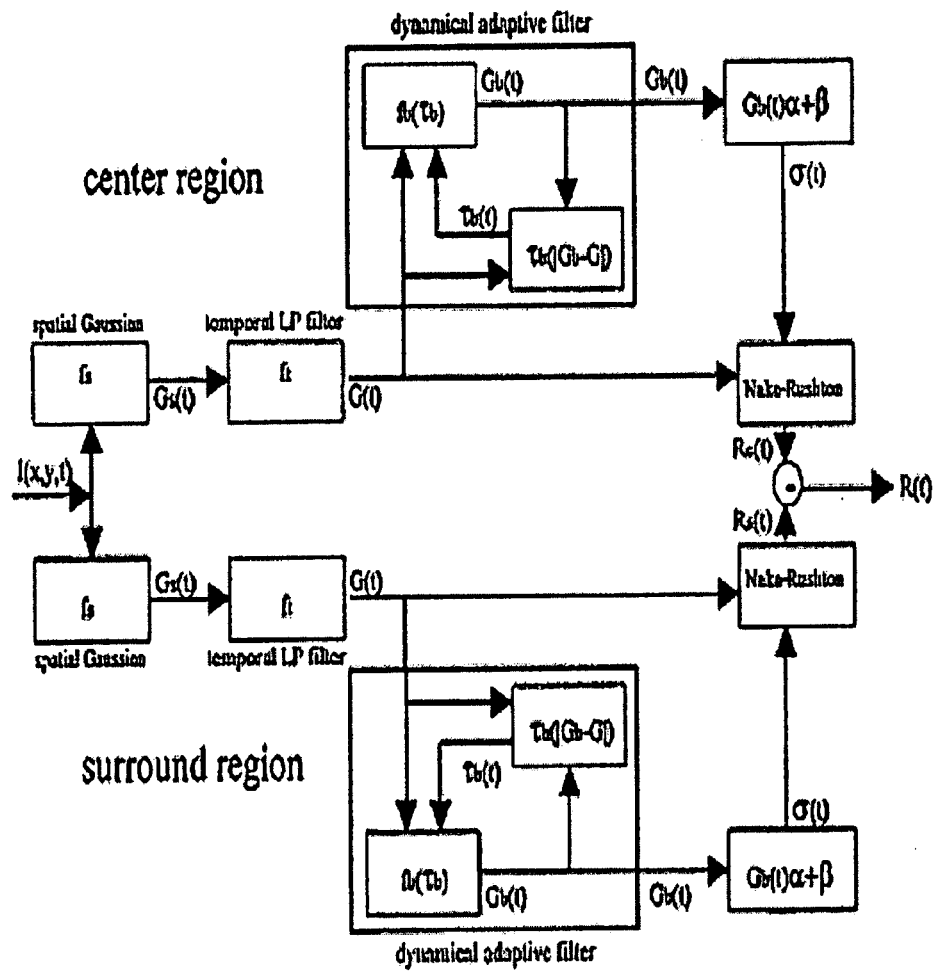
FIG. 1a is a prior art schematic block diagram of a model of ganglion cell response.
Figure 2:
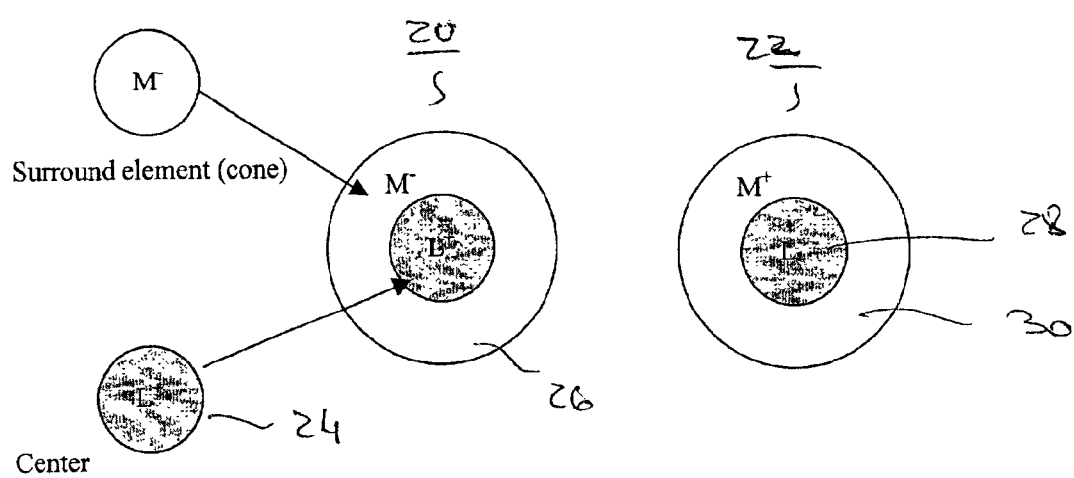
FIG. 2 is a schematic description of on-center and off-center opponent receptive fields.
Figure 3:
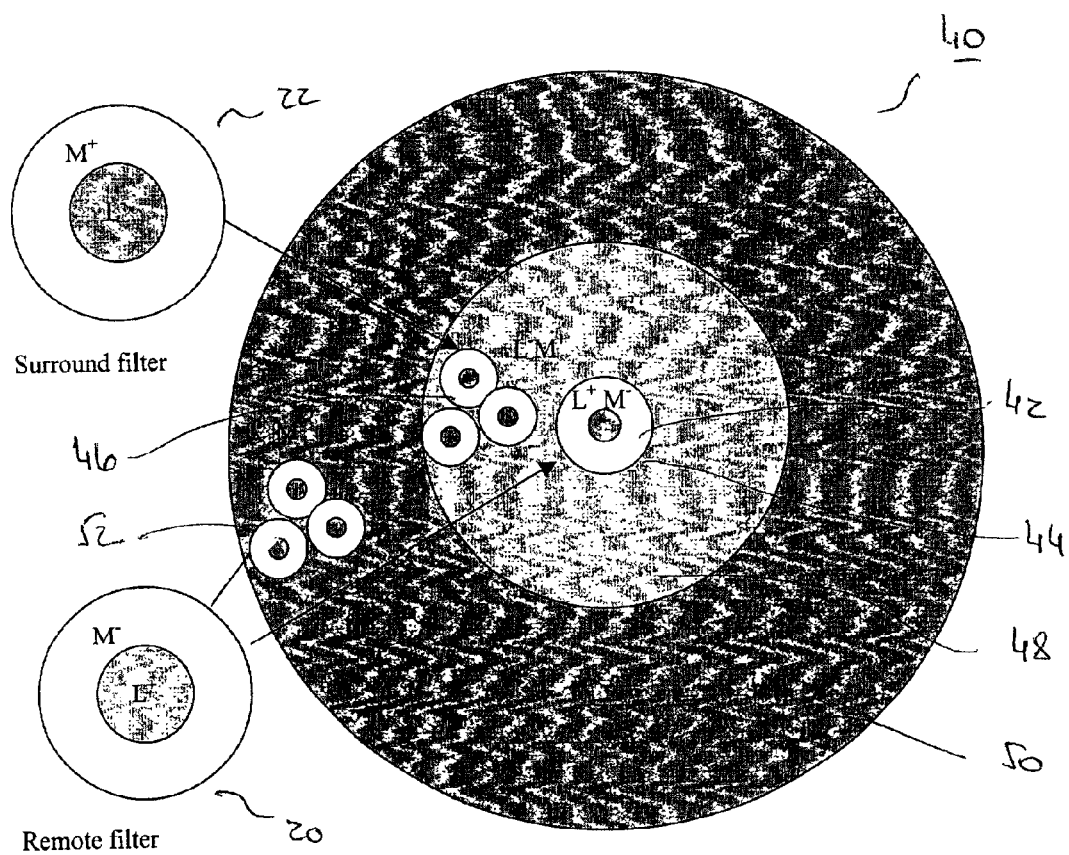
FIG. 3 is a schematic description of a double-opponent RF having a corresponding double-opponent remote sub-region.

The mathematical simulation of the physiological processes related to color contrast perception proceeds as follows: the spatial response profiles of the two sub-regions of each (on- and off-) ganglion cell RF Parvo response ganglion cells (P-RGC), the "center" and the "surround" regions, are preferably expressed by a Difference of Gaussians (DOG). As in Dahari and Spitzer, the first step of the present invention is the transformation of each input image to an "output function" or "spectral response function" G. For each color (red, green and blue), there is a center spectral response function $G_c$ (also writen as Lcen, Mcen and $S_{cen}$) and a surround spectral response function $G_s$ (also written as $L_{srnd}$, $M_{srnd}$ and $S_{srnd}$). Each of the three center response functions $G_c$ is computed by convolving the corresponding color image with a center local spatial Gaussian filter $f_c$, as shown in equations 2 and 3 of Dahari and Spitzer, thereby producing a center smoothed image whose pixel values are the required $G_c$s. Similarly, each of the three surround response functions $G_s$ is computed by convolving the corresponding color image with an opposite sign surround local spatial Gaussian filter $f_s$, thereby producing a surround smoothed image whose pixel values are the required $G_s$s. Typical values of the radii p of the Gaussian filters are 0.5 pixels for the center filter and 0.5–9 pixels for the surround filter.

$$p:=p/(p+p_0)$$

wherein p represents a pixel value, $p_0$ is a saturation constant, and ":=" represents replacement.

An emulated opponent response $R_{op}$ (where R refers to L, M, S and optionally Y="yellow") is the subtraction between the center and the surround response values at a given pixel: for on-center cells the opponent response is expressed as $L^+M^-$, $M^+L^-$ and $S^+(L+M)^-$, and for off-center cells as $L^-M^+$, $M^-L^+$ and $S^-(L+M)^+$ Opponent responses are calculated next. Specifically, for "on-center" opponent responses $$R_{op(l+)} = L^+M^- = G_{c,l} - G_{s,m}$$

$$R_{op(m+)} = M^+L^- = G_{c,m} - G_{s,l}$$

$$R_{op(s+)} = S^+(L+M)^- = G_{c,s} - (G_s + G_s)_{(l+m)}/2 \quad (1)$$

Optionally, a yellow center response ($R_{op((m+l)+)}$) is also used. Similar subtractions are carried out to obtain "off-center" opponent responses $L^-M^+$, $M^-L^+$ and $S^-(L+M)^+$ (and optionally a yellow opponent response $R_{op((m+l)-)}$) by subtracting the blue surround response from the yellow center response.

The action of the RFs of double-opponent cells is emulated in one of two ways: 1) by assigning the emulated filtered response (explained below) (or response in the specific case of feeding one opponent cell as the center of double opponent center receptive field region) of a first on-center opponent group (for example $L^+M^-$) to a "do-center" response, and assigning the emulated filtered response of a corresponding, off-center opponent group (for example $L^-M^+$) to a "do-surround" response, or 2) by using emulated filtered responses of "on-center" type opponent groups (or response in the specific case of feeding one opponent cell as the center of double opponent center receptive field region), for example assigning the emulated filtered response of an on-center $L^+M^-$ group to a do-center response, and the emulated filtered response of an on-center $M^+L^-$ group to a do-surround response. Hereinbelow, the "-" sign in all subscripts including two or more letters, for example in "do-c" of $L_{do-c}$, means of e.g., "$L_{do-c}$= the red response of the double-opponent center". An exemplary mathematical formulation for the three-color double-opponent center responses is given by:

$$L_{(do-c)} = \iint_{center\ area} R^*_{op(l+)} f_{(c-do)}(x,y) dx dy \quad (2)$$

$$M_{(do-c)} = \iint_{center\ area} R^*_{op(m+)} f_{(c-do)}(x,y) dx dy$$

$$S_{(do-c)} = \iint_{center\ area} R^*_{op(s+)} f_{(c-do)}(x,y) dx dy$$

Figure 4:
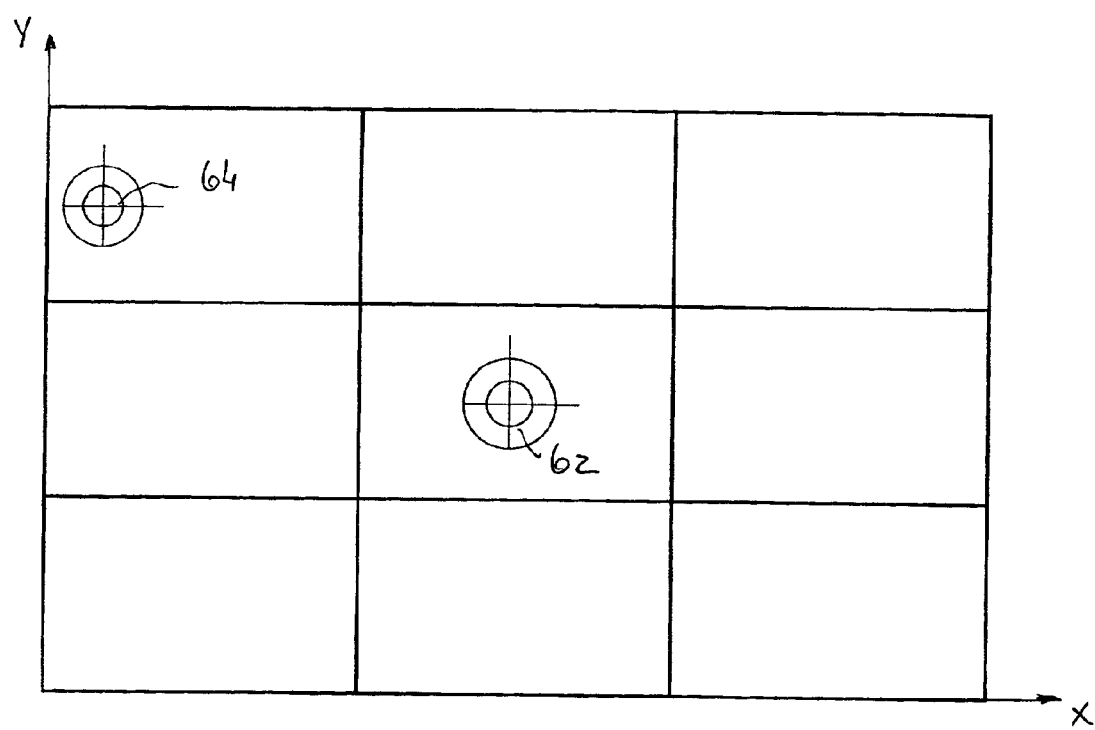
FIG. 4 is a schematic illustration of the operation performed to obtain a filtered opponent response.

$R^*_{op(l+)}$, $R^*_{op(m+)}$, $R^*_{op(s+)}$ (and optionally a fourth "yellow" $R^*_{op(l+m)+}$) are each both a spatial and a spectral filtered response, similar to $R_{op(l+)}$, $R_{op(m+)}$, $R_{op(s+)}$ (and optionally the fourth "yellow" $R_{op((l+m)+)}$) but related to different areas than the corresponding $R_{op}$s. $R_{op}$ and $R^*_{op}$ and similar pairs below are also referred to herein as, respectively, "non-filtered" and "filtered" responses (in spite of the fact that the "non-filtered" values are obtained of course with operations involving filters). The relationship between non-filtered and filtered opponent responses is illustrated schematically in FIG. 4, where an exemplary (non-filtered) on-center opponent response $R_{op}(x_1, y_1)$ is calculated for pixel 62 centered at $(x_1, y_1)$ using eq. 1, i.e. subtracting the value at $(x_1, y_1)$ of a surround response function $G_s(x_1, y_1)$ from a center response function $G_c(x_1, y_1)$. As explained above, both $G_s(x_1, y_1)$ and $G_c(x_1, y_{-1})$ are functions obtained by convolutions involving local filters. A filtered response $R_{op}*(x_1, y_1)$ to be used in eq. 2 for the computation of the do-cell response for the do-cell centered at $(x_1, y_1)$, (and thus associated with $R_{op}(x_1, y_1)$) is calculated in general by applying the local filters in the convolutions yielding $G_c$ and $G_s$ at different (than $x_1, y_1$) locations 64. The "filtering" operation for obtaining filtered responses thus involves moving the filters over the relevant area of the integration and obtaining for each pixel a function value. The value of $R*_{op}$ is in general different from that of $R_{op}$, except for the special case when both are calculated at the same (x, y).

Optionally, a fourth yellow do-center response is obtained as $((M+L)-S)_{d+cen}$ by using $R*_{op((l+m)+)}$. Thus, the responses $L_{(do-c)}$, $M_{(do-c)}$ and $S_{(do-c)}$ (and optionally $(M+L)-S)_{d+cen}$) are the products of convolutions of corresponding filtered opponent responses with a center spatial weight function $f_{(c-do)}$. $f_{(c-do)}$ is preferably a radially symmetric Gaussian exponentially decaying function, with a radius of 1–6 pixels.

The do-surround responses are computed in a similar fashion. An exemplary mathematical formulation for the three color double-opponent surround responses (and optionally a fourth, yellow $(L+M)_{(do-s)}$) is given by:

$$L_{(do-s)} = \iint_{surround-area} R^*_{op(l-)} f_{(s-do)}(x, y) dx dy \quad (3)$$

$$M_{(do-s)} = \iint_{surround-area} R^*_{op(m-)} f_{(s-do)}(x, y) dx dy$$

$$S_{(do-s)} = \iint_{surround-area} R^*_{op(s-)} f_{(s-do)}(x, y) dx dy$$

where $R*_{op(l-)}$, $R_{op}*_{(m-)}$, and $R_{op}*_{(s-)}$ (and optionally a fourth "yellow" $R*_{op(l+m)-}$) are off-center filtered responses similar to $R_{op(l-)}$, $R_{op(m-)}$, $R_{op(s-)}$ (and optionally $R_{op(l+m)-}$) but related to different areas, as explained above. These off-center filtered opponent responses are convolved with a surround spatial weight function $f_{(s-do)}$. $f_{(s-do)}$ is preferably an radially symmetric Gaussian exponentially decaying function with a radius of 9–31 pixels.

As mentioned above, a key innovative element of the present invention is the addition of a new, "do-remote" signal needed for the adaptation mechanism of color contrast, for each double-opponent cell. This "do-remote" signal represents the peripheral area that extends far beyond the borders of the classical RF of the $P_{do}$-LMS double-opponent cell. The four do-remote signals ($L_{(do-remote)}$, $M_{(do-remote)}$, $S_{(do-remote)}$ and $(L+M)_{(do-remote)}$ that emulate the effect of the remote areas of the double-opponent cells are defined in eq. 4 as the convolution of a corresponding filtered double-opponent center response with a remote spatial weight function (representing spectral content) $f_r$ applied to do-remote area 50, for each pixel in the remote area.

$$L_{(do-remote)} = \iint_{remote-area} L^*_{(do-c)} f_r(x, y) dx dy \quad (4)$$

$$M_{(do-remote)} = \iint_{remote-area} M^*_{(do-c)} f_r(x, y) dx dy$$

-continued $$S_{(do-remote)} = \iint_{remote-area} S^*_{(do-c)} f_r(x, y) dx dy$$

$$Y_{(do-remote)} = (L+M)_{(do-remote)} = \iint_{remote-area} \frac{(L+M)^*_{(do-c)}}{2} f_r(x, y) dx dy$$

where $L*_{(do-c)}$, $M*_{(do-c)}$, $S*_{(do-c)}$, and $(L+M)*_{(do-c)}=Y*_{(do-c)}$ are double-opponent center filtered responses acting on the do-remote areas, related to the responses of eq. 2 in the same fashion as explained above for opponent responses. In other words, the same calculations that were carried out for opponent RFs are done here, but in relation to each pixel that belongs to the do-remote area.

$f_r$ is preferably an exponentially decaying spatial-weight function, an example of which is shown in Eq. 5. Alternatively, $f_r$ can be a Gaussian function, or any other decaying function.

$$f_r(x, y) = \frac{\exp[-\sqrt{(x^2 + y^2)} / K_{remote}]}{A_{remote}} \quad (5)$$

$K_{remote}$ is a constant which defines the slope of the weight function, and $A_{remote}$ is a factor of normalization to a unit:

$$A_{remote} = \left( \iint_{remote-area} \exp\left(-\frac{\sqrt{x^2 + y^2}}{k_{remote}}\right) \right) \quad (6)$$

The next step is obtaining the responses of the double-opponent RFs that are fed by both the do-center responses (eq. 2) and by the do-surround responses (eq. 3). The double-opponent responses or "output functions", before the adaptation stage are given by:

$$L_{do} = L_{(do-c)} - M_{(do-s)}$$

$$M_{do} = M_{(do-c)} - L_{(do-s)}$$

$$S_{do} = S_{(do-c)} - (L+M)_{(do-s)}) \quad (7)$$

Optionally, a fourth (yellow) double-opponent output function is obtained by subtracting the blue do-surround response from the yellow do-center response. The do-remote signals of eq. 4 can alternatively be built from filtered double-opponent responses $L*_{(do)}$, $M*_{(do)}$, $S*_{(do)}$ and $Y*_{(do)}=(L+M)*_{(do)}$ (related to the do-responses in eq. 7 as explained for the opponent case above) through appropriate convolutions with the remote spatial weight function, instead of using the double-opponent center filtered responses $L*_{(do-c)}$, $M*_{(do-c)}$, $S*_{(do-c)}$ and $Y*_{(do-c)}$.

Figure 5:
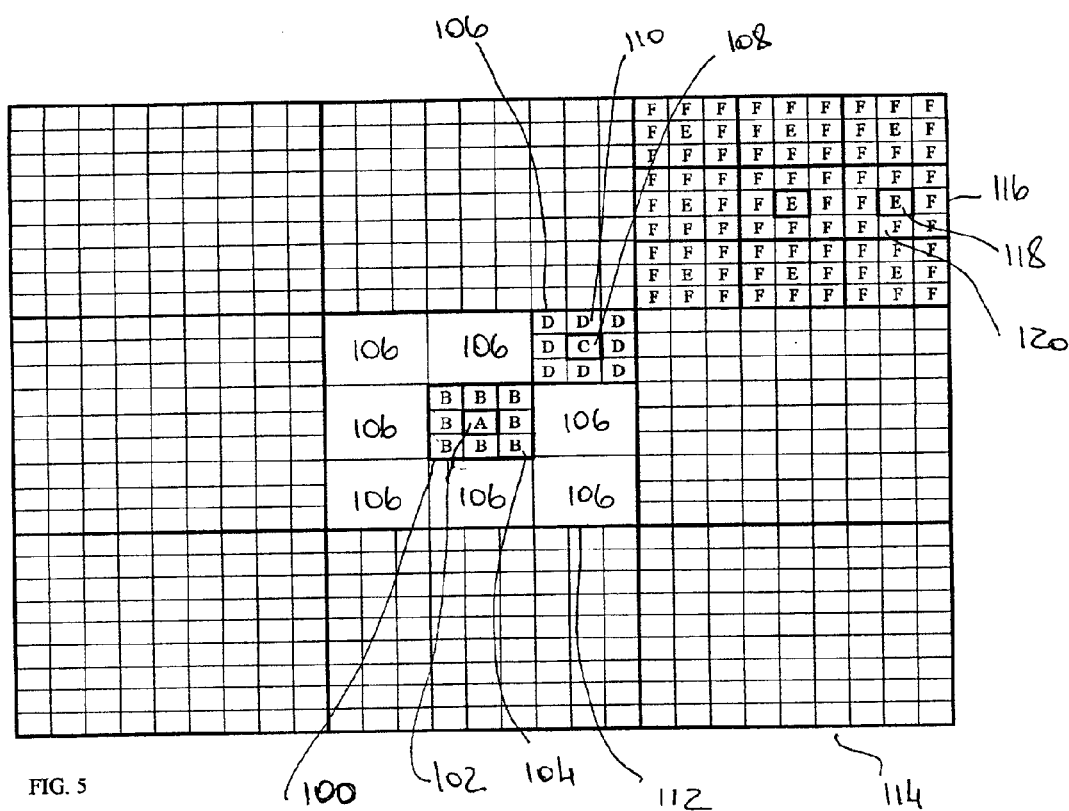
FIG. 5 is a schematic description of a double-opponent receptive field that includes the remote influences.
Figure 6:
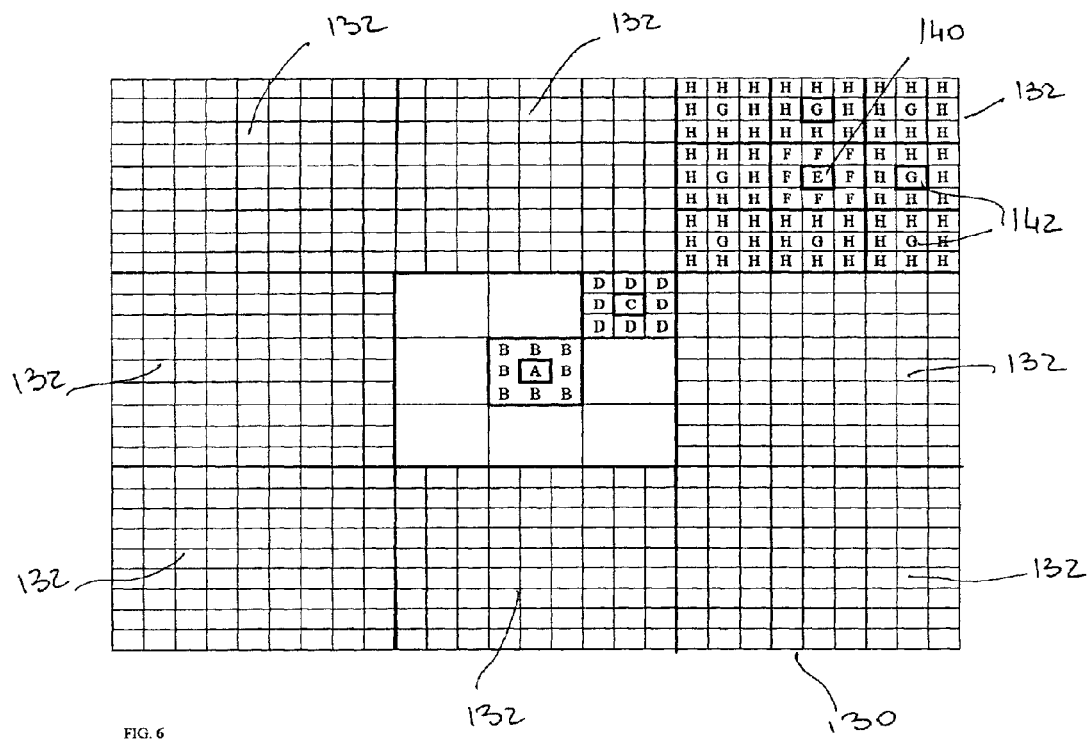
FIG. 6 is an alternative schematic description of a double-opponent receptive field that includes the remote influences.

As can be understood from the subscripts "c" (center), "s" (surround), "do-c" (double-opponent center), "do-s" (double-opponent surround) and "do-r" or "do-remote" (double-opponent remote), the various receptive fields ("RF") and spatial convolutions extend over different numbers of pixels. FIGS. 5 and 6 show two different schematic descriptions of double-opponent RFs which include the remote influences. FIG. 5 shows an on-center cell 100 with a center RF 102 (pixel A) and a surround RF 104 (pixels B). The on-center cell is surrounded by 8 off-center cells 106, each with a center RF 108 (pixel C) and a surround RF 110 (pixels D). Cell 100 and cells 106 are opponent cells, and together constitute a double-opponent ("do") cell 112, on-center cell 100 constituting a "do-center" RF, and off-center cells 106 constituting a "do-surround" RF. Do-cell 112 has a do-remote RF 114, which includes on-center opponent cell RFs 116, each with a center RF 118 (pixel E) and a surround RF 120 (pixels F). For simplification purposes, only nine such RF 116 are shown in the upper right corner of do-remote RF 114, with the understanding that they are repeated in the rest of the (unmarked) pixels. The different marking of pixels in cell 100 and RFs 116 indicates the different values resulting from the application of different spatial weight functions at those locations. In the example of FIG. 5, the different receptive fields extend over different areas: for both on-center and off-center opponent cells, the center RF includes one pixel, while the surround RF extends over the 8 pixels immediately surrounding each center. For double-opponent cell 112, do-center RF 100 extends over 9 pixels and the do-surround RF (which includes the nine cells 106) extends over the adjacent 72 pixels. Do-remote RF 114 extends over the 648 pixels surrounding do-cell 112. It should be clear that different areas over which the spatial weight functions are applied in the convolutions can also partially overlap, or be separated by gaps. For example, cells 116 whose RFs compose the do-remote RF and who are used in computing the do-remote signal can partially overlap, or can be separated by gaps.

FIG. 6 shows an alternative double-opponent RF description. The main difference vs. FIG. 5 lies in the composition of the do-remote RF: instead of (as in FIG. 5) being composed entirely of on-center cell RFs, a do-remote RF 130 is composed here of a group of do-cell RFs 132, each RF 132 composed of a center "on-center" opponent RF 140 (pixels E and F) and nine surrounding "off-center" opponent RFs 142 (pixels G and H). For simplification purposes, only one of the nine RF 132 is shown in detail. The pixels in the on-center and off-center RFs of the do-center, surround and remote regions are again marked differently to indicate the effect of the convolutions with different spatial weight functions. The do-remote area extends over the same number of pixels as in FIG. 5.

The descriptions in FIGS. 5 and 6 are for illustration purposes, and the areas given are typical. However, it is to be understood that each area mentioned can extend over a range around the typical value cited. Thus, an opponent surround RF (e.g. 104) may include the 16 pixels immediately surrounding the eight pixels mentioned above, thereby extending over a total of 24 pixels. The RF of a double-opponent center typically extends over about 3 by 3 pixels, see FIG. 6. The do-surround RF may extend over an area defined by another 11 pixels extending each way in both x and y (i.e. bound externally by a boundary of 31×31 pixels) while the do-remote RF may extend an additional 10 pixels in each direction (i.e. bound externally by a boundary of 51×51 pixels, and internally by the 9×9 to 31×31 boundary). The domains of the convolutions for computing the different terms roughly overlaps the corresponding RF areas. At the boundaries of the images, all convolutions use periodic boundary conditions.

Adaptation

The adaptation for color contrast correction is carried out on the double-opponent responses of eq. 7, in a manner analogous to the adaptation procedure in Dahari and Spitzer, by using the do-remote signals. In the form of the present invention that is applied to digital video photography, time variation is taken into account. The output functions G (where G stands for $L_{do}$, $M_{do}$ and $S_{do}$, the double-opponent output functions in eq. 7) are now functions of time t, specifically the sampling time of the images. In addition to the spatial and spectral weight functions which are applied above to entire images at a single value of t, temporal filters, as defined below, are applied pixel-wise to these functions of t. Two kinds of temporal filters are used: temporal, preferably low pass filters, which are independent of the functions to which they are applied, and adaptive temporal filters, which depend, at any given time t, on the prior history of the functions to which they are applied.

For each color, the present invention computes an adapted (or "corrected") double-opponent response $R_{(do-a)}(G,t)$ at each pixel by using a Naka-Rushton-like equation:

$$R_{(do-a)}(G, t) = R_{max} \frac{G(t)}{G(t) + \sigma(G, t)} \quad (8)$$

$R_{max}$ is a maximum response that is used as a normalization factor. For the remote adaptation of each double-opponent RF region, an adaptive function $G_b(t)$ analogous to Dahari and Spitzer's adapting component $G_b(t)$, is used in the computation of the semisaturation term $\sigma$,:

$$\sigma(t) = \alpha G_b(t) + \beta \quad (9)$$

In the application of the method to still photography (no time dependence) i.e. at steady state (at t=∞), function $G_b$ is time-independent and is given (using the red double-opponent response as an example) by:

$$G_{b(t=\infty)} = L_{(do-remote)} \quad (10)$$

Similar equations are used for the other colors response components (green, blue and optionally yellow). Unlike Dahari and Spitzer, the Naka-Rushton equation of the present invention is applied to the double-opponent RFs (emulating the cortical color-coded cells), and the adaptation factor (the "remote influence") is applied to the semi-saturation term in the denominator of eq. 8. More generally, for example in video applications, the adaptive function is computed by convolving the corresponding output function with corresponding adaptive temporal filters as shown in equations 7 and 8 of Dahari and Spitzer, and in the boxes labeled "dynamical adaptive filter" of FIG. 1 of Dahari and Spitzer. The temporal filters are applied pixel-wise and locally to the entire image. What makes these filters adaptive is that the associated time "constants" actually are functions of both time and the prior history of G. The most preferred form of the function $\tau_b$ that describes the decay of the adaptive filter is:

$$\tau_b(t) = \tau_m / (1 + abs\ (G(t) - G_b(t))/G_n) \quad (11)$$

In this expression, $\tau_m$ is the maximum expected value of $\tau_b(t)$, G(t) is the output function, after convolution with the corresponding low-pass temporal filter; $G_b(t)$ is the adaptive function, i.e., the output of the convolution, at times prior to the time at which the convolution presently is being computed; and $G_n$ is a normalization constant. Because the adaptive filter is causal, it is well-defined despite being defined in terms of its own output.

The change in a gain control effect is achieved by the curve-shifting mechanism of the "response vs. log chromatic (or achromatic) contrast illumination" curve, similar to the "response vs. illumination" curve shown schematically in FIG. 6 in Shapley & Enroth-Cugell, Progress in Retinal Research, vol. 3, pp. 263–346, 1984. The gain control effect of the present invention can be seen as a "second order" effect, in contrast with the first order effect embodied in FIG. 6 of Shapley and Enroth-Cugell. The adaptation is reflected in a shift of the response curve as a function of time. Consequently, each time a new range of input intensities to a color channel is viewed, given that the change from the previous stimulation is sufficiently large, the curve shifts, bringing the system to a new adaptation state. This curve shift takes place according to the temporal filter, causing an apparent decaying function of the response.

The significance of applying a variable dynamic temporal component, aside from corresponding to known physiological phenomena (e.g. as explained in Dahari and Spitzer and the references therein) becomes evident when observing the dynamical color contrast adjustment algorithm performance in the absence of such a component. In such a dynamical case, the rate of adaptation changes as a function of signal magnitude of each contrast channel.

One immediate result of the dynamical properties of adaptation mechanisms in video applications, (as also explained in U.S. Pat. No. 5,771,312) is that when a constant image is viewed over a certain time period, its color contrast appears to decay with time.

"Inverse Transformation" or Transformation of the $P_{do-a}$ LMSs Activity to a Perceived Image In order to perform contrast on real images it is necessary to inversely transform the adapted (corrected) double-opponent responses (at any location in the image) into a perceived color. Several different inverse functions, based on different assumptions, can be used for this purpose in preferred embodiments of the present invention. The calculated perceived color contrast is the color contrast that would stimulate the triplet of Parvo double opponent after adaptation ($P_{do-a}$) a LMS cells to the same responses, with a uniform non-contrast surface present in their "remote" areas. The rationale that has lead to this definition is the assumption that the visual system interprets color contrast of an object in a way similar to the one described above. The following equations describe the emulation of the three main double-opponent and opponent color-coded cells, but alternatively all these equations can be applied also to the yellow double-opponent and opponent RFs. In general, the steps in the inverse transformation preferably include: using the adapted double-opponent responses to calculate a new value of a double-opponent response ("new do-response"), assigning the new value to the double-opponent center ("new do-center response") thus obtaining a new value of an opponent response ("new opponent response"), and assigning this new opponent response value to get a new opponent center response, thus returning to eq. 1, which now has "new center" values.

A key assumption in performing an inverse function as described above is that the contrast in the "do-remote" area is equal to that in the double-opponent area. This is expressed as $$L_{do-a} = L_{do-remote} \quad M_{do-a} = M_{do-remote} \quad S_{do-a} = S_{do-remote} \tag{12}$$

Inserting for each color the do-remote expressions of eq. 4, and rewriting eq. 8 for each color channel under assumption (12) yields:

$$L_{do-a} = \frac{L_{do}}{L_{do} + \iint\limits_{remote} L^*_{do-c} f_r(x,y)\, dxdy} \tag{13}$$

$$M_{do-a} = \frac{M_{do}}{M_{do} + \iint\limits_{remote} M^*_{do-c} f_r(x,y)\, dxdy}$$

-continued $$S_{do-a} = \frac{S_{do}}{S_{do} + \iint\limits_{remote} S^*_{do-c} f_r(x,y)\, dxdy}$$

By assuming for each color channel that the semisaturation term expressed by the integral in the denominator equals approximately the adapted double-opponent response (e.g. as an alternative for the red $L_{do-a} \approx \iint L^*_{do-c} f_r(x,y)dxdy$) we get $$L'_{do} = \frac{(L_{do-a})^2}{1 - L_{do-a}} \tag{14}$$

$$M'_{do} = \frac{(M_{do-a})^2}{1 - M_{do-a}}$$

$$S'_{do} = \frac{(S_{do-a})^2}{1 - S_{do-a}}$$

where $L_{do}'$, $M_{do}'$ and $S_{do}'$ (and optionally $Y'_{do}$) are the new double-opponent responses. $L_{do}'$, $M_{do}'$ and $S_{do}'$ (and optionally $Y'_{do}$) are now applied to the corresponding double-opponent center color channel, i.e., $L'_{do}=L'_{do-c}$, $M'_{do}=M'_{do-c}$, $S'_{do}=S'_{do-c}$, (and optionally $Y'_{do}=Y'_{do-c}$), at each pixel, creating for each color a difference ("change") between the original double-opponent center response ($L_{do-c}$, $M_{do-c}$, $M_{do-c}$, $S_{do-c}$, eq. 2) and the new do-center response ($L'_{do-c}$, $M'_{do-c}$, $S'_{do-c}$)

$$\Delta L_{do-c}(x,y) = L'_{do-c}(x,y) - L_{do-c}(x,y) = \frac{L'_{do} - L_{do}}{f_{c-do}(x,y)\iint\limits_{cen} dxdy} \tag{15}$$

$$\Delta M_{do-c}(x,y) = M'_{do-c}(x,y) - S_{do-c}(x,y) = \frac{M'_{do} - M_{do}}{f_{c-do}(x,y)\iint\limits_{cen} dxdy}$$

$$\Delta S_{do-c}(x,y) = S'_{do-c}(x,y) - S_{do-c}(x,y) = \frac{S'_{do} - S_{do}}{f_{c-do}(x,y)\iint\limits_{cen} dxdy}$$

Remembering that do-center responses are equivalent to opponent responses (connected by a convolution with a weight function) the new do-center response values are equivalent to new opponent response values, in the special case when the do-center RF equals the RF of one opponent cell.

In order to find the new opponent center responses, i.e. the new responses of the cones, the $\Delta L(do-c)$, $\Delta M(do-c)$, and $\Delta S(do-c)$ differences are applied to the opponent center, preferably using the following expressions:

$$L'_{cen}(x,y) = a\Delta L_{(do-c)}(x,y) + bL_{cen}(x,y) + cM(x,y)_{srnd}$$

$$M'_{cen}(x,y) = a\Delta M_{(do-c)}(x,y) + bM_{cen}(x,y) + cL(x,y)_{srnd}$$

$$S'_{cen}(x,y) = a\Delta S_{(do-c)}(x,y) + bS_{cen}(x,y) + c(L+M)(x,y)_{srnd} \tag{16}$$

where a, b and c are constant parameters that can be identical for all color channels, or alternatively are different for each color of the center sub-region. Typical ranges for a, b, and c are a=1–2, b=0–1 and c=0–2. The outputs of eq. 16, $L'_{cen}$, $M'_{cen}$ and $S'_{cen}$ are the new values of L, M and S. Alternatively, the new cone response values can be obtained with a multiplication operation instead of a summation operation, for example using the following type of expression (for the red channel, with similar expressions for the other color channels): $L'_{cen}(x,y)=aL_{cen}(bL'_{do-c}(x,y)+cL_{cen}(x,y)+dM_{srnd}+\epsilon)$ where a, b, c, and $\epsilon$ are constant parameters with typical value ranges of: a=1–5; b=1–5; c=0–2, d=0–5, and $\epsilon$, a constant which is normally 0. For specific uses such as correcting JPEG images, "a" in eq. 16 and in the multiplication operation above can be assigned negative values (e.g. −1 to −5). Thus, modified new cone responses can be obtained either by an additive operation, i.e. by adding a change to the original value, or by a multiplication operation as shown above. Another alternative for obtaining the new opponent center (i.e.cone) responses through an additive operation as in equation 16 is (for the red channel as an example) $L'_{cen}(x,y)=bL'_{do-c}(x,y)+cL_{cen}(x,y)+dM_{srnd}+\epsilon$, where the typical value ranges are: b=1 30, c=0 1, d=0 5, and $\epsilon$=normally zero. For specific uses such as correcting JPEG images, "b" in the additive operation above can be assigned negative values (e.g. −1 to −30).

Finally, a simple inverse transformation from the LMS scale to the CIE-RGB (either directly or by going through the CIE-XYZ scale) can be performed. It is important to note that the method of the present invention is independent of the color scale used, and that there are other scales, such as the non-linear Lab scale, to which the method of the present invention is equally applicable.

Intensity Adaptation

Intensity adaptation or contrast adjustment on the achromatic information in a color image is connected to the color contrast adaptation described above, in the sense that it uses a similar physiological basis for the algorithm and a similar sequence of steps, except that in one alternative case ("case 1") the adaptation is performed on the center and surround areas of the opponent RFs, and not on the double-opponent RFs as in the color contrast case. Another difference vs the color contrast adaptation is that in the intensity contrast adaptation of case 1, an inverse transformation may not be applied. Intensity adaptation can be applied independently on achromatic images (non-color or black-and-white pictures) or on the intensity domain of color images. For intensity adaptation, the method emulates two types of ganglion cells of the magno pathway, the on-center and off-center medium wavelength opponent (M-opponent) cells. In a preferred embodiment of the intensity adaptation, the remote adaptation is applied to the center sub-region of opponent RFs (or alternatively to the center and surround sub-regions of the opponent RFs), unlike in color contrast, in which remote adaptation is applied to double-opponent RFs. Alternatively, achromatic contrast adjustment can be performed on double-opponent RFs too.

The information contained in a color or black-and-white scene is processed through rod cells 10 (FIG. 1) or through the three cone types. In the first stage in the "achromatic contrast" or intensity adaptation method (algorithm), an emulation of this action is done under the assumption that the three cone types absorb the same amount of light. Alternatively, the starting point of the forward transformation in this case, as in the color contrast case, can be an image acquired using any of the means described above. Regardless of the color scale in which the image is obtained—RGB, XYZ, (Yxy), Lab, or any other CIE scale—the intensity value at each pixel can be obtained by known mathematical manipulations. Thus, the starting point is a known intensity value at each pixel.

The steps in the intensity adjustment method start in a similar fashion with that in the color contrast adjustment method, with the distinctive difference that one emulates rod cells and not cones. Thus, if the input is the intensity spectrum of a scene, an emulated pigment response $Y_{pigment}$ is given by $$Y_{pigment} = \int_{visual\ range} I_{rod}(\lambda)\mathcal{R}(\lambda)I(\lambda)d\lambda \tag{17}$$

where $I_{rod}(\lambda)$ is the spectral absorption function of the rods as a function of the wavelength $\lambda$; $\mathcal{R}(\lambda)$ is the reflectance property of the surface at any specific location in the image; and $I(\lambda)$ is the spectral composition of the illumination falling on this location.

In a similar fashion, the emulated responses of the rod-types at each pixel (or the intensity value at each pixel) $R_{rod}$ are expressed by a Naka-Rushton equation as a function of their inputs $Y_{pigment}$, $$R_{rod} = \frac{Y_{pigment}^n}{Y_{pigment}^n + \sigma_{(NR)}^n} \tag{18}$$

Here too, in the case that the intensity information is extracted from rods, parameters n and $\sigma_{NR}$ are similar to those related to cones (see eq. 2). Alternatively, eqs. 17 and 18 are not relevant and are not used if the starting point is an existing image.

Continuing along the lines of the color contrast equations, a "center" response before the adaptation is now defined as $$G_{cen} = \iint_{center\ area} R_{rod} f_c(x,y) dx dy \tag{19}$$

where the RF region is preferably circular, $f_c$ is preferably a Gaussian decaying spatial-weight function, analogous to that in eq. 4. The "surround" response, which now represents the surround sub-region of the RF of a Magno response ganglion cell (M-RGC), is defined as $$G_{srnd} = \iint_{surround\ area} R_{rod} f_s(x,y) dx dy \tag{20}$$

where $f_s$ is also a Gaussian spatial-weight function with assign opposite to that of $f_c$. As in the color contrast case, the total weight of $f_c$ is 1, while the total weight of $f_s$ is 1/(center/surround ratio) (1/CSR). The steps above are repeated for off-center type cells.

As mentioned already, a key difference in intensity contrast vs. the color contrast adaptation is that in the present invention a "remote" component needed for the intensity adaptation is computed already at the opponent RF stage for both "center" and "surround" regions of the on-and off-center RFs. The "remote" signal (or "response") representing an adaptation component derived from peripheral regions, i.e., areas that extend outside and beyond the classical RF ("remote adaptation"), is calculated separately for each of the sub-regions (or alternatively applied only to the "center" area of the on-center and off-center cell types) using an equation of the type:

$$G_{remote} = \iint_{remote\ area} G^*_{cen} f_r(x, y) dxdy \quad (21)$$

where $G^*_{cen}$ is a filtered response (with a definition similar to that in the color contrast case) similar to the center response in eq. 19, but related here to the remote area through the convolution with a remote spatial weight function $f_r$. Alternatively, an additional remote signal can be built with a surround filtered response $G^*_{srnd}$ similar to the surround response of eq. (20), but related here to the remote area (by convolution with a remote spatial weight function $f_r$, and using an integration similar to that in eq. 21).

The mechanism for the intensity adaptation application can now be calculated in one of two ways. One way (Case 1) is to apply the adaptation and the remote area influence at the emulation stage of ganglion RF regions (eqs. 20, 21) or alternatively (Case 2) at the stage of the cortical level, in which case the adaptation is applied on the double-opponent RFs (similar to the color coded cells case).

Case 1: The M-RGCs 'center' and 'surround' sub-regions are adapted separately (the values of the parameters are based on electrophysiological findings, in a similar manner to that found and analyzed for M-RGCs by Shapley & Enroth-Cugell and Dahari & Spitzer). As described in these references, and as for color contrast, the response of an "on" and "off" M-RGC to a stable visual stimulus at $t=\infty$ (the "static case") is:

$$R_{op}(t = \infty) = \frac{G_{cen}}{G_{cen} + \sigma_{cen}} - \frac{G_{srnd}}{G_{srnd} + \sigma_{srnd}} \quad (22)$$

Where $\sigma$ is an adaptation factor which depends on the stimulation (here, at $t=\infty$) of both the sub-regions and that of the remote area. In other words, the adapted opponent response is obtained by a subtraction of the adapted surround response from the adapted center response. The adaptation factor of each sub-region has separate 'local' and 'remote' components and consists of the same spectral properties as the sub-region. For example, for the "center" sub-region, the adaptation factor is given by:

$\sigma_{cen} = \sigma_{cen,local} + \sigma_{cen,remote}$ where $\sigma_{cen,local} = \alpha_{cen} G_{cen} + \beta_{cen}$ and $\sigma_{cen,remote} = c_{cen} G_{remote}$ \quad (23)

The adaptation factors for surround sub-regions are similarly defined, and include both local and remote adaptation components. $\alpha$, $\beta$ and c for both center and surround adaptation factors are constants with different values for the 'center' and for the 'surround'. $\alpha$ and $\beta$ are determined as in Dahari and Spitzer, while c in eq. 23, the weight function of the remote adaptation component, typically ranges between 1–30 for both center and surround adaptation factors. The method can be alternatively applied without the surround signal and its remote mechanisms, i.e. using only the first term in eq. 22. Furthermore, the method can be alternatively applied without considering the local adaptation, i.e. using only the second term in eq. 23.

If one defines $a=\alpha+1$ and $b=\beta$ and substitutes the terms of eq. 23 in eq. 22, the emulated responses of the on-center and off-center cells M-RGC are written as:

$$R_{op} = \frac{G_{cen}}{a_{cen}G_{cen} + b_{cen} + c_{cen}G_{remote}} - \frac{G_{srnd}}{a_{srnd}G_{srnd} + b_{srnd} + c_{srnd}G_{remote}} \quad (24)$$

For the dynamical case, one can follow a similar sequence to that expressed by eqs. 9–11, to be used here however for achromatic intensity.

Case 2: In the alternative embodiment of performing the adaptation for intensity contrast by applying it at the double-opponent stage, eqs. 22–24 are not implemented. In general, the steps of the method for intensity adaptation at the double-opponent stage follow those of the color contrast adaptation. One difference vs. the color contrast case is that the input of the do-surround sub-region is optional, and intensity adaptation can be performed without it. In analogy with eq. 1, the opponent cell's response, $R_{op}$ is the subtraction between the center and the surround output function values of on-center and off-center cell types:

$$R_{op} = G_{cen} - G_{srnd} \quad (25)$$

where $G_{cen}$ is equivalent to $G_c$ and $G_{srnd}$ is equivalent to $G_s$, both however being applied here for the cells that code the intensity domain. The off-center cells have similar RF structure but with opposite signs.

In analogy with the color contrast case, the achromatic double-opponent center signal (do-center response) is built from the filtered responses of the opponent on- and off-center cells:

$$G_{(do-c)} = \iint_{center\ area} R^*_{op} f_{(do-c)}(x, y) dxdy \quad (26)$$

where $R^*_{op}$ is a filtered response similar to $R_{op}$ but related to a different area (as explained in the color contrast case), an area defined in the integration The typical size of the do-center contains 1–16 pixels in the simulations applications.

The 'do-surround' signal is similarly defined as $$G_{(do-s)} = \iint_{surround\_area} R^*_{op} f'_{(do-s)}(x, y) dxdy \quad (27)$$

The do-remote signal, in analogy with eq. 4 is given by $$G_{(do-remote)} = \iint_{remote\ area} R^*_{(do-c)} f_r(x, y) dxdy \quad (28)$$

The double-opponent responses (the responses of the on-center and off-center double-opponent M-RGCs), before the adaptation stage, are given by:

$$R_{do} = G_{(do-c)} - G_{(do-s)} \quad (29)$$

The do-remote signal can alternatively be built from the filtered response $R^*_{do}$ of the double-opponent RF. The adaptation, for still and video images, as well as the inverse transformation are then performed analogously to those in the color contrast case, following the same sequence of steps, except for the fact that it refers here to achromatic information, and that, as mentioned above, the intensity adaptation can be performed without the input of the do-surround response.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for correcting the color contrast of a scene, the scene including an intensity spectrum at each of a plurality of pixels, the method comprising the steps of:
   a) providing a red image, a green image, and a blue image, each image having a pixel value at each of the plurality of pixels;
   b) computing a center red response, a center green response and a center blue response based on said images;
   c) computing a surround red response, a surround green response and a surround yellow response based on said images;
   d) computing a red, a green and a blue on-center opponent and filtered opponent response, based on said center and surround responses;
   e) computing a red, a green and a yellow off-center opponent and filtered opponent response based on said center and surround responses;
   f) computing a red, a green and a blue double-opponent response (do-response) and a corresponding filtered double-opponent response based on said on-center and off-center filtered opponent responses;
   g) computing a red, a green and a blue do-remote response based on a set of responses selected from the group consisting of said on-center filtered opponent responses and said filtered double-opponent responses; and
   h) for each pixel: correcting each of said red, green, and blue double-opponent responses for color contrast using respectively said red, green and blue do-remote response, thereby producing corrected red, green and blue double-opponent responses.

2. The method of claim 1, further comprising the steps of: at each pixel:
   i) computing a yellow center response and a blue surround response;
   j) computing a yellow double-opponent response and a corresponding yellow filtered double-opponent response based on said yellow center and said blue surround responses;
   k) computing a yellow do-remote signal based on a response selected from the group consisting of said yellow center response and said filtered yellow double-opponent response; and
   l) for each pixel: correcting said yellow double-opponent response for color contrast using said yellow do-remote signal, thereby producing a corrected yellow double-opponent response.

3. The method of claim 1, wherein said step of providing a red image, a green image, and a blue image includes: at each pixel:
   i) multiplying the intensity spectrum by a spectral response function of a red photoreceptor, thereby providing a red spectral product;
   ii) multiplying the intensity spectrum by a spectral response function of a green photoreceptor, thereby providing a green spectral product; iii) multiplying the intensity spectrum by a spectral response function of a blue photoreceptor, thereby providing a blue spectral product;
   iv) integrating said red spectral product,
   v) integrating said green spectral product, and
   vi) integrating said blue spectral product.

4. The method of claim 1, wherein said step of computing a center red response, a center green response and a center blue response includes, for each said image, convolving said image with a center local spatial filter; and wherein said step of computing a surround red response, a surround green response and a surround yellow response includes, for each said image, convolving said image with a surround local spatial filter.

5. The method of claim 2, wherein said step of computing said red on-center filtered opponent response includes subtracting said green surround response from said red center response, said step of computing said green on-center filtered opponent response includes subtracting said red surround response from said green center response, said step of computing said blue on-center response includes subtracting said yellow surround response from said blue center response.

6. The method of claim 2, wherein said step of computing said red off-center filtered opponent response includes subtracting said green surround response from said red center response, said step of computing said green off-center filtered opponent response includes subtracting said red surround response from said green center response, and said step of computing said yellow off-center filtered opponent response includes subtracting said yellow surround response from said blue center response.

7. The method of claim 1, wherein said step of computing said red, green and blue filtered double-opponent responses based on said on-center and off-center filtered opponent responses further includes computing respective red, green and blue double-opponent center responses and respective red, green and blue double-opponent surround responses.

8. The method of claim 7, wherein said step of computing each said double-opponent center response includes convolving a center filtered response with a center spatial weight function.

9. The method of claim 7, wherein said step of computing each said double-opponent surround response includes convolving a surround filtered response with a surround spatial weight function.

10. The method of claim 8, wherein said center spatial weight function is an exponentially decaying function.

11. The method of claim 9, wherein said surround spatial weight function is an exponentially decaying function.

12. The method of claim 7, wherein said step of computing each said do-remote response includes convolving a corresponding response selected from the group consisting of a said on-center filtered opponent response and a said double-opponent center response, with a remote spatial weight function.

13. The method of claim 12, wherein said spatial weight function in chosen from the group consisting of exponentially decaying functions and Gaussian functions.

14. The method of claim 2, wherein said step of correcting each of said red, green, and blue double-opponent responses for color contrast includes the steps of: for each said double-opponent response a) computing a respective adaptive function $G_b$; and b) computing a respective adaptation factor, based on said respective adaptive function.

15. The method of claim 14, further including applying said respective adaptation factor as a respective semi-saturation factor in a Naka-Rushton type equation operating on each of said double-opponent responses.

16. The method of claim 2, wherein said step of correcting said yellow double-opponent response for color contrast includes the steps of: for each said double-opponent response:

c) computing an adaptive function $G_b$;

d) computing an adaptation factor, based on said adaptive function.

17. The method of claim 14, further including applying said adaptation factor as a semi-saturation factor in a Naka-Rushton type equation operating on said yellow double-opponent response.

18. The method of claim 15, wherein said adaptive function is identical to said do-remote response.

19. The method of claim 15, wherein said adaptive function is time-dependent.

20. The method of claim 17, wherein said adaptive function is identical to said do-remote response.

21. The method of claim 17, wherein said adaptive function is time-dependent.

22. The method of claim 19, wherein said time-dependency of said adaptive function is obtained by a convolution of said double-opponent response with a temporal filter.

23. The method of claim 21, wherein said time-dependency of said adaptive function is obtained by a convolution of said double-opponent response with a temporal filter.

24. The method of claim 22, wherein said temporal filter is an exponentially decaying time function.

25. The method of claim 23, wherein said temporal filter is an exponentially decaying time function.

26. The method of claim 22, wherein said temporal filter is normalized by a denominator equal to $\tau_b(t)=\tau_m/(1+abs(G(t)-G_b(t))/G_n)$ where $\tau_m$ is an expected maximum value of said decaying time function, and where $G_n$ is a normalization constant.

27. The method of claim 23, wherein said temporal filter is normalized by a denominator equal to $\tau_b(t)=\tau_m/(1+abs(G(t)-G_b(t))/G_n)$ where $\tau_m$ is an expected maximum value of said decaying time function, and where $G_n$ is a normalization constant.

28. The method of claim 1, further comprising the step of: inversely transforming said corrected double-opponent responses into corresponding new red, green and blue center responses.

29. The method of claim 28, wherein said inversely transforming includes transforming said new center responses into new opponent cell responses.

30. The method of claim 2, further comprising the step of: inversely transforming said corrected yellow double-opponent response to obtain a new yellow opponent response.

31. A method for adjusting an achromatic contrast of a scene, the scene including an intensity spectrum at each of a plurality of pixels, the method comprising the steps of:

a) providing an image that has an intensity value at each of the plurality of pixels;

b) obtaining an adapted opponent center response using a plurality of said pixel intensity values by:

i) calculating an opponent center response;

ii) providing a center adaptation factor that includes a remote center adaptation term, and iii) combining said opponent center response and said center adaptation factor; and c) at each pixel, correcting the achromatic contrast using said adapted opponent center response.

32. The method of claim 31, wherein said adaptation factor further includes a local center adaptation term.

33. The method of claim 31, further comprising obtaining an adapted opponent surround response, wherein said step of correcting for achromatic contrast includes subtracting said adapted opponent surround response from said adapted opponent center response.

34. The method of claim 33, wherein said step of obtaining an adapted opponent surround response includes:

i) calculating an opponent surround response;

ii) providing a surround adaptation factor, and iii) combining said opponent surround response and said surround adaptation factor.

35. The method of claim 34, wherein said surround adaptation factor includes a remote surround adaptation term.

36. The method of claim 34, wherein said surround adaptation factor further includes a local surround adaptation term.

37. The method of claim 31, wherein said step of providing pixel intensity values includes: at each pixel: i) multiplying the intensity spectrum by a spectral response function, thereby providing a spectral product; and ii) integrating said spectral product.

38. The method of claim 31, wherein said step of obtaining an adapted opponent center response includes convolving each said pixel intensity value with a center spatial weight function.

39. The method of claim 34, wherein said step of obtaining an opponent surround response includes convolving each said pixel intensity value with a surround spatial weight function.

40. A method for adjusting an achromatic contrast of a scene, the scene including an intensity spectrum at each of a plurality of pixels, the method comprising the steps of:

a) providing an image having a pixel value at each of the plurality of pixels;

b) computing a center response based on said image;

c) computing a surround response based on said image;

d) computing an on-center filtered opponent response, based on said center and surround responses;

e) computing an off-center filtered opponent response based on said center and surroundresponses;

f) computing a double-opponent response and a corresponding filtered double-opponent response based on said on-center and off-center filtered opponent responses;

g) computing a do-remote response; and h) for each pixel: correcting said double-opponent responses for achromatic contrast using said do-remote signal.

41. The method of claim 40, wherein said step of providing an image includes: at each pixel:

i) multiplying the intensity spectrum by a spectral response function to obtain a spectral product; and ii) integrating said spectral product.

42. The method of claim 40, wherein said step of computing a center response includes convolving said image with a center local spatial filter.

43. The method of claim 40, wherein said step of computing said on-center filtered opponent response includes subtracting an on-center surround response from an on-center center response.

44. The method of claim 40, wherein said step of computing said off-center filtered opponent response includes subtracting an off-center surround response from an off-center center response.

45. The method of claim 40, wherein said step of computing said double-opponent response and said filtered double-opponent response includes computing a double-opponent center response.

46. The method of claim 40, wherein said step of computing said double-opponent response and said filtered double-opponent response further includes computing a double-opponent surround response.

* * * * *